United States Patent
Bissontz

(10) Patent No.: US 9,487,074 B2
(45) Date of Patent: Nov. 8, 2016

(54) POWER TAKE OFF SPEED INTERLOCK

(71) Applicant: International Truck Intellectual Property Company, LLC, Lisle, IL (US)

(72) Inventor: Jay Bissontz, Fort Wayne, IN (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 0 days.

(21) Appl. No.: 14/778,756

(22) PCT Filed: Apr. 15, 2013

(86) PCT No.: PCT/US2013/036608
§ 371 (c)(1),
(2) Date: Sep. 21, 2015

(87) PCT Pub. No.: WO2014/171918
PCT Pub. Date: Oct. 23, 2014

(65) Prior Publication Data
US 2016/0046179 A1    Feb. 18, 2016

(51) Int. Cl.
| | |
|---|---|
| *B60K 6/48* | (2007.10) |
| *B60K 6/22* | (2007.10) |
| *B60K 17/28* | (2006.01) |
| *B60W 20/00* | (2016.01) |

(52) U.S. Cl.
CPC ............... *B60K 6/22* (2013.01); *B60K 17/28* (2013.01); *B60W 20/00* (2013.01); *B60Y 2300/423* (2013.01); *Y10S 903/00* (2013.01)

(58) Field of Classification Search
CPC .......... B60K 1/02; B60K 6/48; B60K 23/00; B60K 25/00; B60K 6/22; B60K 17/28
See application file for complete search history.

(56) References Cited

U.S. PATENT DOCUMENTS

| | | | | |
|---|---|---|---|---|
| 3,561,277 | A | 2/1971 | Boyle et al. | |
| 5,562,173 | A * | 10/1996 | Olson | B60K 23/00 180/53.1 |
| 6,963,796 | B2 * | 11/2005 | Larson | G06F 1/3203 180/65.31 |
| 7,104,920 | B2 * | 9/2006 | Beaty | B60K 6/48 477/5 |
| 9,033,077 | B2 * | 5/2015 | Kurkinen | F04B 17/05 180/65.21 |
| 9,079,493 | B2 * | 7/2015 | Pociask | B60W 10/02 |
| 2001/0036882 | A1 * | 11/2001 | Hrazdera | B60K 25/00 477/166 |
| 2007/0006572 | A1 * | 1/2007 | Yu | F01N 3/021 60/285 |
| 2008/0065285 | A1 * | 3/2008 | Yakes | B60K 1/02 701/22 |
| 2009/0236156 | A1 * | 9/2009 | Promersberger | B60K 6/48 180/53.4 |
| 2012/0239226 | A1 * | 9/2012 | Bissontz | B60W 10/30 701/2 |
| 2012/0271493 | A1 * | 10/2012 | Gratton | B60L 15/20 701/22 |
| 2013/0164148 | A1 * | 6/2013 | Kurkinen | B60K 6/48 417/53 |

* cited by examiner

*Primary Examiner* — Hau Phan
(74) *Attorney, Agent, or Firm* — Jeffrey P. Calfa; Mark C. Bach

(57) ABSTRACT

A hybrid-electric vehicle powertrain including a first prime mover and an electric traction motor/generator provides for electric operation of a power take off. A sensor indicates electric fraction motor/generator speed. A control system provides for limiting engagement of the power take off to the electric traction motor/generator through a transmission to periods when the electric traction motor/generator is turning a less than a predefined maximum speed.

15 Claims, 2 Drawing Sheets

US 9,487,074 B2

POWER TAKE OFF SPEED INTERLOCK

BACKGROUND

1. Technical Field

The field relates power take off from hybrid electric vehicles and more particularly to use of the vehicle's powertrain control system to control engagement and disengagement of the power take off.

2. Description of the Technical Field

Some hybrid electric vehicles transmit mechanical torque and angular velocity to a power take off (PTO) output shaft through a use a manual or automated manual type transmission. In these circumstances the PTO conventionally includes an intermediary coupling and decoupling mechanism (hereafter PTO coupler) between the transmission and the loads attached to a PTO output shaft. A problem can occur during either the initial engagement or re-engagement of the intermediary mechanism if the transmission's internal drive gearing is not fully stopped. Engagement combined with the inertia cost down of the traction motor/generator and transmission gearing can create a condition within the intermediary mechanism where coupling gears and shift collar teeth clash due to a difference in speeds (angular velocities) of the two active members. This produces gear grinding problems.

SUMMARY

A hybrid-electric vehicle powertrain including a first prime mover and an electric traction motor/generator provides for electric operation of a power take off. A sensor indicates electric traction motor/generator speed. A control system provides for limiting engagement of the power take off to the electric traction motor/generator through a transmission to periods when the electric traction motor/generator is turning a less than a predefined maximum speed.

DETAILED DESCRIPTION

Figure 1:
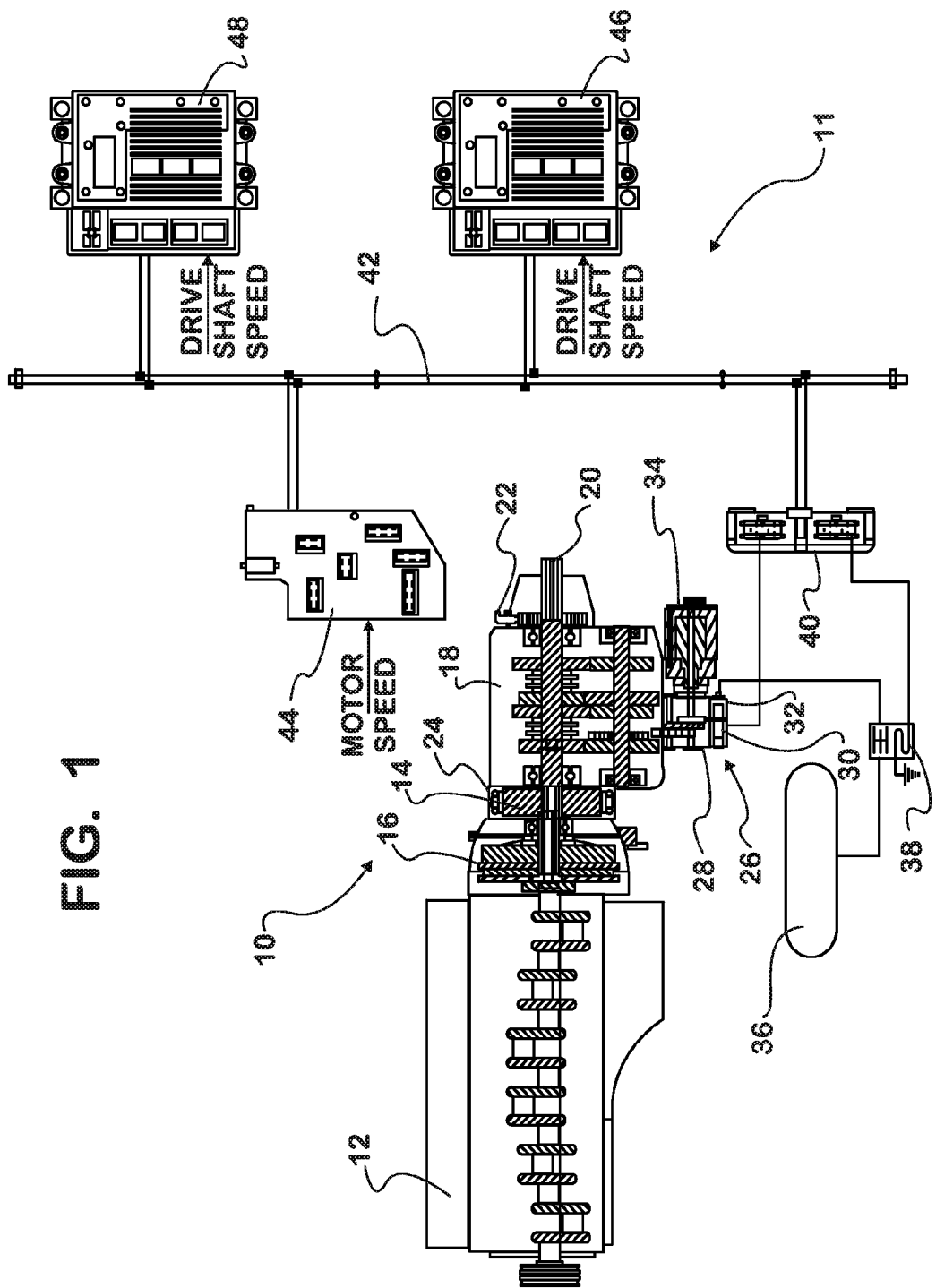
FIG. 1 is a schematic of a hybrid-electric vehicle drive train and associated control system.

In the following detailed description, like reference numerals and characters may be used to designate identical, corresponding, or similar components in differing drawing figures. Furthermore, example sizes/models/values/ranges may be given with respect to specific embodiments but are not to be considered generally limiting.

Referring to FIG. 1 a hybrid-electric powertrain 10 comprises an internal combustion (IC) engine 12, an electric traction motor/generator 14, a clutch 16 by which the electric traction motor/generator 14 and IC engine 12 may be mechanically coupled to one another, a manual or automated manual transmission 18 by which torque and angular velocity may be applied to an output shaft/driveshaft 20. That hybrid-electric powertrain 10 incorporates an IC engine 12 is illustrative only, as the engine could be selected from any number of sources of mechanical energy, such as a gas turbine or steam engine and the like.

Depending from the transmission 18 is a power take off (PTO) 26 through which torque and angular velocity can be transferred from the transmission 18 to a PTO output shaft 32. PTO output shaft 32 is attached to PTO integrated equipment 34 such as a hydraulic or pneumatic pump, an electrical generator, and the like. PTO 26 includes a PTO coupler 28 which allows engagement and disengagement of the PTO output shaft 32 to the transmission 18. Translation of the PTO coupler 28 between engaged and disengaged positions is effected using a PTO actuator 30.

PTO actuator 30 is depicted as a spring biased pneumatic piston in cylinder device however, PTO actuator 30 can be realized in a number of different ways. The apparatus for engaging and disengaging the mechanical PTO coupler 28 can include without limitation: an electromechanical solenoid and linkage, electromechanical solenoid pneumatic valve with piston, mechanized ball screw and nut, a pneumatic piston and clutch, a hydraulic piston and clutch, linear motors, worm gears, and the like. For a spring biased pneumatic piston in cylinder device a source of compressed air is used (compressed air tank 36) to urge the spring biased piston against the direction of bias to engage the PTO coupler 28. The application of compressed air occurs through a solenoid controlled valve 38 with the valve controlled in turn by an electrical signal from RPM 40. RPM 40 is also connected to receive an engagement indication signal from the PTO actuator 30. While present the engagement signal is not needed for operation of the presently described control arrangement.

Hybrid-electric powertrain 10 is instrumented and the instrumentation includes two angular velocity sensors. The first is an output shaft angular velocity sensor 22 which provides a voltage signal proportional to the angular velocity at which the output shaft 20 is turning. The second is a motor angular velocity sensor 24 which provides a signal which is proportional to the angular velocity of electric traction motor/generator 14. These signals are routed by wire connections to nodes of a powertrain/vehicle control system 11, in particular the angular velocity signal for the output shaft/driveshaft 20 is transmitted to either (or both) the engine controller 46 or the transmission controller 48, which report the value over the twisted pair datalink 42. The body controller 44 accesses the messages carrying the angular velocity signal from the datalink 42. The output of the motor angular velocity sensor 22 is applied to the body controller 44.

The powertrain control system 11 is based on a controller area network (CAN) architecture which includes a twisted wire pair datalink 42 to transmit data between a plurality of nodes. The architecture of FIG. 1 is a simplified representation with only four nodes shown, a body controller 44, an engine controller 46, a transmission/traction motor controller 48 and a remote power module (RPM) 40. The RPM 40 operates essentially as a slave of the body controller 44 to provide the function of a PTO coupler engagement/disengagement controller. The body controller 44 has control over PTO 26 operation and receives various chassis inputs through which requests for PTO 26 operation occur. The chassis inputs can include operator requests for PTO 26 operation (which result in engagement or disengagement) and requests relating to PTO output shaft 32 angular velocity and torque (which are communicated to the engine controller 46 or to the transmission controller 48 in its function as motor controller).

In addition to the chassis inputs relating to requests relating to PTO 26 operation various interlock conditions may be programmed into the system which must be satisfied before the powertrain 10 enters an PTO operational state. Some of the interlock conditions may be values for chassis inputs and signals relating to other interlocks may be communicated to body controller 44 over twisted wire pair datalink 42. Examples of values relating to interlocks communicated over twisted wire pair datalink 42 include vehicle speed and current gear achieved from the transmission controller 48. Values which may be received as chassis inputs include park brake status.

The powertrain control system 11 leverages a controller area network (CAN) based control architecture to control engagement and disengagement of the PTO coupler 28 mechanism. In relation to this the hybrid-electric powertrain 10 can source angular velocity and torque during the operation of the PTO integrated equipment 34 from two sources, those being the IC engine 12 or the electric traction motor/generator 14. A hybrid-electric powertrain which can support PTO operation by use of its traction motor without operation of its engine is said to be in an electrified PTO state or "ePTO mode." The ePTO mode usually occurs outside of an operator's specific request during PTO operation on a hybrid-electric vehicle when its rechargeable energy storage system (RESS) has an adequate state of charge.

In the ePTO mode for hybrid-electric powertrain 10 it remains possible for the IC engine 12 to produce angular velocity, however, the clutch 16 positioned between the IC engine 12 and the electric traction motor/generator 14 is either partially or completely open and energy is not transmitted from IC engine to the PTO output shaft 32. Body controller 44 with its subordinate RPM 40 use the traction motor/generator 14 angular velocity data from motor angular velocity sensor 24 to intelligently control engagement and disengagement of the PTO actuator/shift mechanism 30 to avoid clashing of PTO coupler 28 gearing or excessive clutch slippage due to significant speed differentials between active coupling members.

In ePTO mode it is possible for the PTO coupler 28 to disengage while the electric traction motor/generator 14 is turning. In ePTO modes of interest here the current gear achieved by the transmission 18 is always neutral (meaning torque is not transmitted to transmission output shaft 20). Upon disengagement of the PTO coupler 28 there will be no load on the electric traction motor/generator 14 and the electric traction motor/generator will begin to coast down unless some provision is made for regenerative braking of the motor/generator. This is not usual as the available energy for recapture is usually small. The PTO integrated equipment 34 is usually under load and will decelerate much more quickly than the electric traction motor/generator 14. A speed difference will open between the components that only begins closing about the time the PTO integrated equipment 34 comes to a stop and disappears only when the electric traction motor/generator 14 itself comes to a stop. The speed difference between electric traction motor/generator 14 and the PTO integrated equipment 34 when the PTO coupler 28 is disengaged is usually substantially equal to the angular velocity measurement of the motor angular velocity sensor 24.

The body controller 44 does not engage the PTO actuator 30 (or more precisely, cause the RPM 40 to apply an activation signal to solenoid 38) until the angular velocity speed of the PTO coupler 28 matches, or is within a predetermined speed range, of the traction motor/generator 14. It is possible to customize the speeds at which PTO coupler 28 engages and disengages based on rate of angular velocity of the traction motor/generator 14. This ability is accomplished through software adjustment parameters built into the body controller 44 software.

Figure 2:
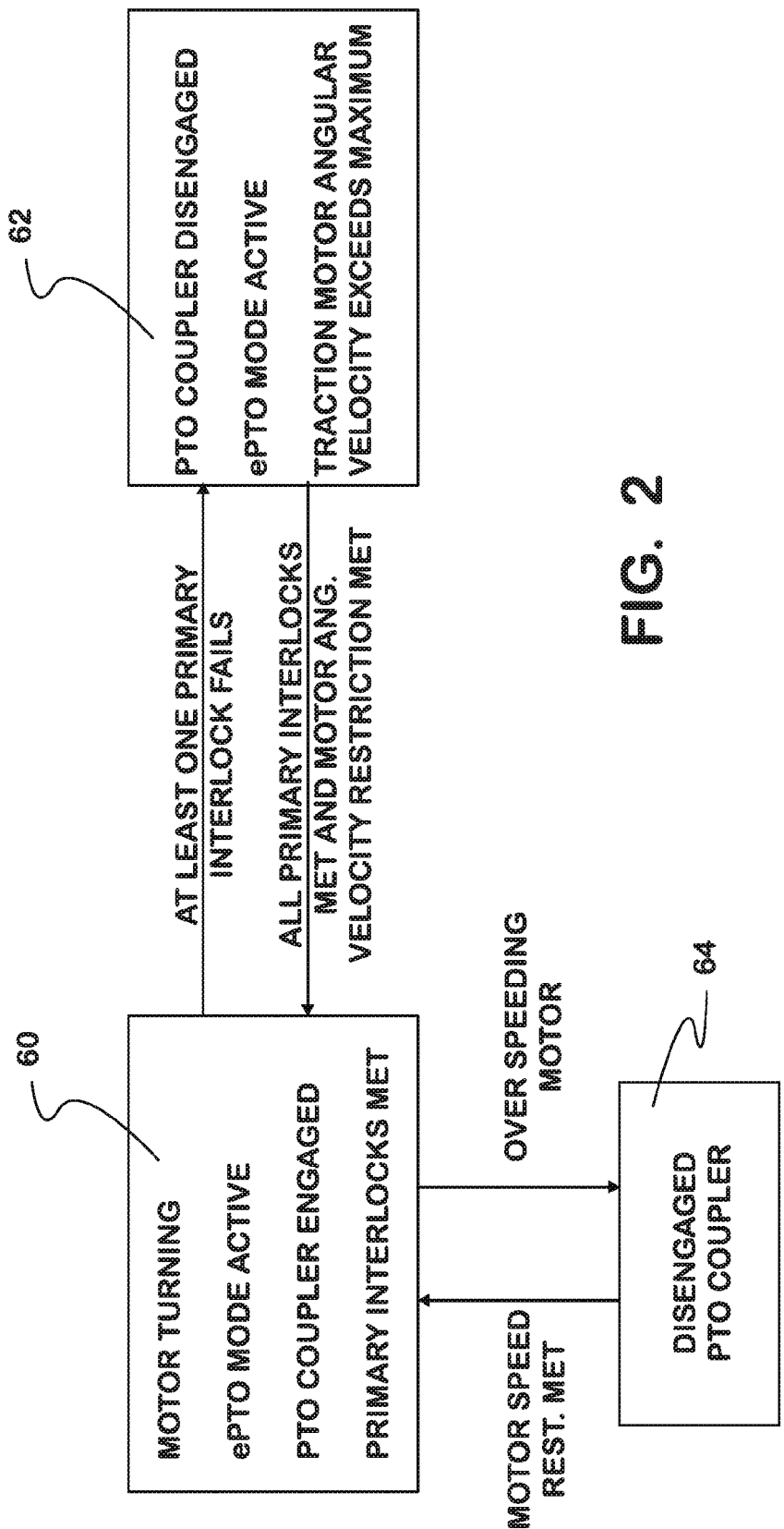
FIG. 2 is a block diagram of a state machine for the hybrid-electric vehicle drive train of FIG. 1.

Referring to FIG. 2 a state machine is used to further explain the present system. State 60 represents a state in which ePTO mode is active, the electric traction motor/generator 60 is turning (note that "turning" does not imply that the motor is receiving electrical energization), the PTO coupler 28 is engaged and the ePTO primary interlock conditions have been met. The primary interlock conditions vary from vehicle to vehicle. A representative set for PTO integrated equipment 34 that includes a manned basket for overhead power line work could be: 1) park brake set; 2) vehicle speed (which may be obtained from the angular velocity of the output shaft 20) of less than 5 kph; and 3) the current gear achieved is neutral. If any of these three conditions fail the state will transition to state 62 where, while ePTO mode remains active the PTO coupler 28 is disengaged. State 62 remains current as long as the electric traction motor/generator 14 is turning at greater than a maximum limit, which can be on the order of 4 to 5 RPM. No transition from state 62 to state 60 occurs until motor angular velocity falls below the maximum limit (assuming the other conditions for state 60 have been established or restored). In other words the conditions for transitions between states 60 and 62 are not symmetric.

It is possible for ePTO mode to initially be in either state 60 or state 62. In addition, it is also possible to establish that the motor be turning at some minimal rate, say at least 1 RPM, before a transition from state 62 to state 60 occurs. If traction motor/generator 14 is motionless upon ePTO mode becoming active than a minimal application of power to the motor/generator may occur to initiate turning. This is done to ease meshing of the gears within the PTO coupler 28 without giving rise to grinding.

A state 64 is illustrated indicated disengagement of PTO coupler 28 where motor angular velocity of the electric traction motor/generator 14 has exceeded a limit for the PTO integrated equipment 34. For example, motor angular velocity may reach a speed which would produce cavitation in a hydraulic pump which was part of the PTO integrated equipment 34. In this case the PTO coupler 28 may be reengaged upon lapse of the over speed condition.

The state machine of FIG. 2 is not comprehensive with respect all possible vehicle states. For example, it will be clear to those skilled in the art that should ePTO mode becomes inactive upon closure of clutch 16 to connect the electric traction motor/generator 14 to IC engine 12, which may occur if the state of charge of a vehicle RESS (not shown) decline to a level that initiates operation of the IC engine to back drive the electric traction motor/generator 14 to generate electricity. In this case the powertrain 10 may remain in a PTO mode, however it will not be an ePTO mode.

What is claimed is:

1. A vehicle powertrain comprising:
   an electric motor;
   a transmission mechanically coupled to the electric motor;
   a power take off mechanically coupled to the transmission, the power take off having an output shaft and a coupler;
   the coupler having engaged and disengaged states wherein in the engaged state of the coupler the transmission is mechanically linked to the output shaft and in the disengaged state of the coupler the transmission is mechanically free of the output shaft of the power take off;
   an actuator for moving the coupler between its engaged and disengaged states;
   an angular velocity sensor for the electric traction motor;

a source for requests to supply power to the output shaft of the power take off; and a controller responsive to a current request to supply power to the output shaft of the power take off when the coupler is in its disengaged state for operating the actuator to move the coupler to its engaged state when the angular velocity of the electric traction motor is with selected limits.

2. The vehicle powertrain of claim 1, further comprising:
the electric motor is a traction motor/generator in a hybrid-electric drive train;
the hybrid-electric drive train includes an engine; and
a clutch is disposed between the engine and the traction motor/generator for selective mechanical coupling of the engine with the traction motor/generator.

3. The vehicle powertrain of claim 2, wherein the selected limits include a maximum non-zero upper limit on angular velocity of the traction motor/generator.

4. The vehicle powertrain of claim 3, wherein the controller is responsive to the traction motor/generator exceeding an upper angular velocity limit with the coupler in its engaged state for operating the actuator to move the coupler to a disengaged state.

5. The vehicle powertrain of claim 3, wherein the controller is responsive to the traction motor/generator exceeding an upper angular velocity limit with the coupler in its engaged state for operating the actuator to move the coupler to a disengaged state.

6. The vehicle powertrain of claim 2, wherein the selected limits are programmable by an operator and include a maximum non-zero upper limit on angular velocity of the electric traction motor/generator and a minimum non-zero lower limit on angular velocity of the traction motor/generator.

7. A vehicle powertrain comprising:
an engine;
an electric traction motor/generator;
a clutch disposed for mechanically coupling the engine with the electric traction motor/generator;
a sensor for indicating electric traction motor/generator speed;
a transmission coupled to the electric traction motor/generator and having a driveshaft output;
a power take off attached to the transmission from which the power take off can receive rotational impetus and torque;
an output shaft from the power take off;
a coupler within the power take off which in an engaged state transmits rotational impetus and torque from the transmission to the output shaft;
an actuator for moving the coupler between its engaged state and an unengaged state; and
means for preventing operation of the actuator to move the coupler from its unengaged state to its engaged state when the electric traction motor/generator is turning a greater than a predefined speed.

8. The vehicle powertrain of claim 7, further comprising:
the means for preventing including a vehicle control system having a body controller for receiving chassis inputs initiating a power take off mode of operation when the vehicle is stationary.

9. The vehicle powertrain of claim 8, further comprising:
the vehicle control system including means for establishing an electrified power take off mode within the power take off mode in which the clutch is operated to disengage the engine from the electric traction motor/generator.

10. The vehicle powertrain of claim 9, further comprising:
an electric motor/generator angular velocity sensor; and
the body controller being programmable to limit operation of the actuator for engaging the coupler during electrified power take off mode operation to within defined lower and upper speeds of the electric traction motor/generator.

11. The vehicle powertrain of claim 9, further comprising:
an electric motor/generator angular velocity sensor; and
the body controller being programmable to limit operation of the actuator for engaging the coupler during electrified power take off mode operation to below an upper maximum speed of the electric traction motor/generator.

12. A method of operating a power take off from a hybrid-electric vehicle powertrain, the hybrid-electric vehicle powertrain including an engine, an electric traction motor/generator, a clutch for mechanically coupling the engine with the electric traction motor/generator, and a transmission coupled to the electric traction motor/generator and having a driveshaft output with the power take off including a coupler and an output shaft with the coupler being operable for engaging the output shaft to the transmission for the transmission of rotational impetus and for disengaging the coupler, the method comprising the steps of:
providing an electrified power take off mode in which the clutch is disengaged and in which the coupler may be operated for engagement of the output shaft with the transmission and disengagement of the output shaft with the transmission;
defining a first set of conditions under which the coupler remains engaged during operation in the electrified power take off mode;
monitoring electric traction motor/generator speed; and
defining a second set of condition which includes all of the first set of conditions and at least a first condition relating to electric traction motor/generator speed under which the coupler is allowed to move to an engaged condition from a disengaged condition during operation in the electrified power take off mode.

13. The method of claim 12, in which conditions relating to electric traction motor/generator speed include upper and lower limits between which movement of the coupler from a disengaged to an engaged condition are allowed.

14. The method of claim 13, in which the lower limit is non-movement of the electric traction motor/generator.

15. The method of claim 13, in which the upper and lower limits are programmable.

* * * * *